United States Patent Office 3,527,806
Patented Sept. 8, 1970

3,527,806
10-ALKYL-ALKENYL- OR BENZYL-5-(3-AMINO-PROPYLIDENE)-DIBENZO[a,d]CYCLOHEPTENES
Gerald Rey Bellet and Hans Spiegelberg, Basel, Switzerland, assignors to Hoffmann-La Roche Inc., Nutley, N.J., a corporation of New Jersey
No Drawing. Filed Mar. 3, 1967, Ser. No. 620,241
Claims priority, application Switzerland, Mar. 17, 1966, 3,904/66
Int. Cl. C07c 87/28
U.S. Cl. 260—570.8     8 Claims

ABSTRACT OF THE DISCLOSURE 5-(aminopropylidene-dibenzo[a,d]cycloheptenes having anti-depressant activity.

BRIEF SUMMARY OF INVENTION

This invention relates to novel intermediates and to compounds characterized by the formula:

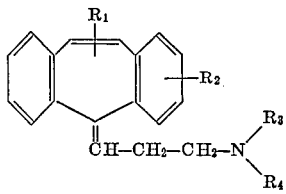

wherein $R_1$ is selected from the group consisting of alkyl, alkenyl and benzyl; $R_2$ is selected from the group consisting of hydrogen and halogen; $R_3$ is alkyl; $R_4$ is selected from the group consisting of hydrogen and alkyl; and $R_3$ and $R_4$, taken together, is a member selected from the group consisting of lower alkylene, lower oxa-dialkylene and lower aza-dialkylene, and pharmaceutically acceptable acid addition salts thereof.

DETAILED DESCRIPTION

As used herein, the term "alkyl" is to be understood to mean a straight or branched chain lower alkyl group, preferably one having from 1–4 carbon atoms, such as, methyl, ethyl, propyl and butyl.

The term "alkylene" is to be understood to mean lower alkylene having from 1–5 carbon atoms.

The term "alkylidene" is to be understood to mean a lower alkylidene, preferably one having from 1–4 carbon atoms, such as, methylidene.

The term "alkenyl" is to be understood to mean a straight or branched chain lower alkenyl group, preferably one having from 2–4 carbon atoms, such as, allyl.

The term "aralkylidene" is to be understood to mean a lower aralkylidene group having from 7–10 carbon atoms, such as, benzylidene.

The terms "halogen" and "halo" include chlorine, bromine, fluorine and iodine; chlorine and bromine being preferred.

$R_3$ and $R_4$, taken together with the attached nitrogen atom, represent a 5–6 ring atom heterocyclic radical, for example, 1-pyrrolidinyl, 1-piperidyl, 1-piperazinyl and 4-morpholinyl.

The term "anion" is to be understood to mean an anion of an organic acid or inorganic acid, such as, chloride, sulfate, acetate p-toluene-sulfonate and the like.

Examples of compounds of this invention corresponding to Formula I are:
5-(3-dimethylamino-propylidene)-10-allyl-dibenzo[a,d]cycloheptene;
5-(3-dimethylamino-propylidene)-10-methyl - dibenzo-[a,d]cycloheptene;
5-(3-methylamino-propylidene) - 10 - methyl-dibenzo-[a,d]cycloheptene; and the like.

In accordance with this invention, compounds characterized by the formula:

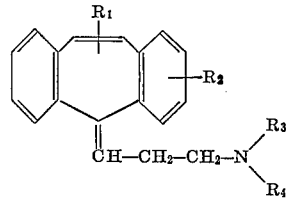

wherein $R_1$, $R_2$, $R_3$ and $R_4$ are as previously described can be prepared by dehydrating a compound selected from the group consisting of compounds of the formulas:

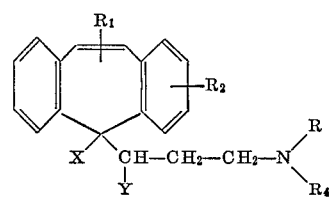

and

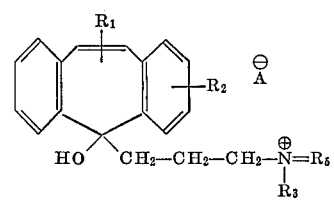

wherein $R_1$, $R_2$, $R_3$ and $R_4$ are as previously described, $R_5$ is selected from the group consisting of alkylidene and aralkylidene, A is an anion selected from the group consisting of organic and inorganic anions, and X is hydrogen when Y is hydroxyl, and Y is hydrogen when X is hydroxyl.

Compounds of Formula II are exemplified by:
5-hydroxy-5-(3-dimethylamino-propyl)-10-methyl - dibenzo[a,d]cycloheptene, and the like.

Compounds of Formula III are exemplified by:
N-benzylidene-N-[3-(5-hydroxy - 10 - methyl-dibenzo-[a,d]cycloheptene-5-yl)-propyl]-N-methyl - ammonium-p-toluenesulfonate, and the like.

The dehydration of compounds of Formulas II and III is conveniently carried out with an anhydrous or hydrous hydrohalic acid. A preferred dehydrating agent is an alcoholic hydrohalic acid. However, other dehydrating agents, such as phosphorus oxychloride, p-toluenesulfonyl chloride, sulfuric acid, zinc chloride or potassium bisulfate, for example, in an inert organic solvent such as, chloroform or methylene chloride, are also useful. The dehydration can be accelerated by heating the reaction mixture. The alkylidene and aralkylidene substitutes present in the compounds of Formula III are saponified under the conditions given for the dehydration.

Another embodiment for the preparation of compounds of Formula I comprises reacting a compound of the formula:

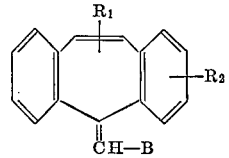

wherein $R_1$ and $R_2$ are as previously described, and B is selected from the group consisting of vinyl and haloethyl,
with a compound of the formula:

V wherein $R_3$ and $R_4$ are as previously described.

Compounds of Formula IV are exemplified by:

5-(3-chloropropylidene)-10-allyl-dibenzo[a,d]cycloheptene;

5-propenylidene-10-methyl-dibenzo[a,d]cycloheptene;

5-(3-chloropropylidene)-10-methyl-dibenzo[a,d]cycloheptene, and the like.

Examples of amines covered by Formula V are: methylamine, dimethylamine, ethylamine, diethylamine, and the like. Examples of heterocyclic compounds covered by Formula V are: pyrrolidine, piperidine, piperazine, morpholine and the like. The preferred compounds of Formula V are the mono- and di-substituted amines.

The compounds of Formula IV, wherein B represented haloethyl, can be aminated by simple reaction with a compound of Formula V.

The compounds of Formula IV wherein B denotes vinyl can be aminated by addition of the appropriate mono- or di-substituted amine of Formula V.

The reaction of the haloethyl compounds of Formula IV with compounds of Formula V can be conveniently carried out in the presence of inert organic solvents, such as, benzene, toluene or the like. The reaction is conducted conveniently at elevated temperatures in the range of 50 to 150° C., preferably of the boiling temperature of the reaction mixture. Readily volatile amines are expediently brought to reaction in a closed system at a temperature of about 100° C. Advantageously, the reaction of the two components is conducted in the presence of an acid-binding agent, such, as, anhydrous potassium carbonate. It is especially convenient to utilize as the acid-binding agent a compound of Formula V. Under the latter conditions, it is sufficient to employ an excess of the amine of Formula V in the reaction with a compound of Formula IV.

The addition of amines of Formula V to the vinyl compounds of Formula IV is conveniently carried out in the presence of a metal, such as, lithium or sodium; a metal amide, such as, sodium or potassium amide; or a metal-organic compound, such as, a Grignard compound, preferably at a temperature in the range of 50 to 150° C.

The compounds of Formula I, wherein $R_3$ and $R_4$ are alkyl, obtained by dehydration of compounds of Formulas II and III or by amination of compounds of Formula IV, can be dealkylated in a manner similar to those previously utilized for compounds having a secondary amino group. Thus, the dealkylation can, for example, be carried out by allowing a cyanogen halide, such as, cyanogen bromide or a haloformate, preferably ethyl chloroformate to act on the dialkylamino group of a compound of Formula I. In this reaction, one of the two alkyl groups on the nitrogen atom is exchanged for the cyano or alkoxycarbonyl residue and then, in turn, is itself replaced by hydrogen by saponification.

The compounds of Formula I can be converted into acid addition salts with organic or inorganic acids. Thus, they form pharmaceutically aceptable acid addition salts with organic acids, such as, acetic acid, oxalic acid, citric acid, lactic acid, and the like, as well as with inorganic acids, such as, hydrochloric acid, hydrobromic acid, sulfuric acid, and the like.

The tricyclic amines obtained in accordance with the invention consist of an isomer mixture, caused by cis-trans-isomerism and, insofar as they are substituted in the aromatic rings, by position isomerism. Separation of the isomers can be accomplished utilizing methods such as fractional crystallization based on the different solubilities of the bases or acid addition salts. It is advantageous with ring-substituted compounds to separate the isomeric starting compounds prior to further processing.

The compounds of Formula I and the pharmaceutically acceptable acid addition salts thereof obtained in accordance with the invention exhibit multiple actions of the nervous system. The compounds are useful as antidepressants. They are useful in that they reverse either endogenous or exogenous depression of the central nervous system. Preferred for its antidepressive action is 5-(dimethylamino-propylidene) - 10 - allyl-dibenzo[a,d]cycloheptene.

The compounds of Formula I and their pharmaceutically accepetable acid addition salts can be administered orally or parenterally with dosage adjusted to individual requirements. They can be administered therapeutically, for example, orally or parenterally, by incorporating a therapeutic dosage in a conventional dosage form, such as tablets, capsules, elixirs, suspensions, solutions or the like. They can be administered in mixture with conventional pharmaceutical carriers or excipients, such as, for example, corn starch, calcium stearate, magnesium carbonate, calcium silicate, dicalcium phosphate, talc, lactose, and the like. Moreover, they can be administered in the presence of buffers, or agents used to adjust to isotinicity, and the pharmaceutical dosage forms can, if desired, be subjected to conventional pharmaceutical expedients such as, for example, sterilization. As stated above, the dosage can be adjusted to individual requirements. They can also contain other therapeutically valuable substances.

The quantity of active medicament which is present in any of the above-described dosage forms is variable. It is preferred, however, to provide capsules or tablets containing from about 5 mg. to about 50 mg. of the Formula I base or an equivalent amount of a medicinally acceptable acid addition salt thereof. For parenteral administration, it is preferred to provide a solution containing from about 10 mg./ml. to about 20 mg./ml. of the Formula I base, or an equivalent quantity of a salt thereof.

The frequency with which any such dosage form will be administered to a patient will vary, depending upon the quantity of active medicament present therein and the needs and requirements of the patient, as diagnosed by the prescribing physician. Under ordinary circumstances, however, up to about 3 mg./kg. of the compound can be administered orally daily in several dosages. It is to be understood, however, that the dosages set forth therein are exemplary only and that they do not, to any extent, limit the scope or practice of this invention.

The compounds of Formulas II, III and IV are new and are useful intermediates for the preparation of compounds of Formula I.

Compounds of Formula II, in which X represents hydroxyl and Y represents hydrogen can be prepared from a 10- or 11-halo-dibenzo[a,d]cyclohepten-5-one, as follows:

A ketal of 10-bromo-dibenzo[a,d]cyclohepten-5-one is reacted utilizing a metal-organic reaction with an alkyl, alkenyl or benzyl halide to yield the corresponding 10-alkyl, alkenyl or benzyl derivative which, by splitting off the protecting group, can be converted into the 10-alkyl, alkenyl or benzyl-dibenzo[a,d]cyclohepten-5-one, a key intermediate for the starting compounds represented by Formulas III and IV.

The ketone can be linked utilizing a metal-organic reaction to an N-mono- or N-disubstituted 3-amino-propyl halide and transformed by hydrolysis into the desired 5-hydroxy-5-(N-mono- or N-disubstituted 3-aminopropyl) derivative.

It is also possible to react the ketone under the same conditions with an N-mono- or N-disubstituted 3-amino-propyne-(1) and to hydrogenate the triple bond of the 5 - hydroxy - 5 - N-mono- or N-disubstituted 3-aminopropyne-(1) derivative obtained after hydrolysis to the single bond propane. Both processes lead to a 5-(N-mono- or N-disbustituted 3-aminopropyl)-10-alkyl, alkenyl or benzyl-dibenzo[a,d]cycloheptene of Formula II.

Another process for preparing the compounds of Formula II comprises reacting a 10-alkyl, alkenyl or benzyl-dibenzo[a,d]cyclohepten-5-one with an N-mono- or N-disubstituted 3-amino-propyl halide in the presence of 2 gram atoms of sodium per mole of ketone and hydrolyzing the reaction mixture.

The starting compounds of Formula II wherein X represnets hydrogen and Y represents hydroxyl can also be synthesized, as follows:

The ketone named above is reacted utilizing a metal-organic reaction with an ethyl halide and is thereafter hydrolyzed. The carbinol formed is converted by dehydration into the corresponding ethylidene compound having a semicyclic double bond. The ethylidene group is subsequently transformed into the acetyl group by the action of oxidation agents and treatment of the oxidation product with aqueous mineral acid. The 5-acetyl derivative obtained is thereupon reacted with a mono- or di-substituted amine in the presence of formaldehyde to give the corresponding 5-amino-ethylcarbonyl compound and reduced to the desired carbinol of Formula II.

The starting materials of Formula III can be prepared by reacting, for example, the above-mentioned 10-alkyl, alkenyl or benzyl-dibenzo[a,d]cyclohepten-5-one, as previously described, in the presence of 2 gram atoms of sodium per mole of ketone with a 1-substituted 3-amino propyl halide, and hydrolyzing the reaction product to the corresponding 5-hydroxy- 5-amino propyl derivative. This is reacted with an aliphatic or araliphatic aldehyde, preferably with acetaldehyde or benzaldehyde and the resulting Schiff's base is quaternized through the action of an alkylating substance, particularly, through the treatment with an alkyl halide or an alkyltoluene sulfonate.

The starting compounds of Formula IV in which B represents a haloethyl group can be prepared from a 10- or 11-halo-dibenzo[a,d]cyclohepten-5-one as follows:

10-bromo - dibenzo[a,d]cyclohepten-5-one is reacted utilizing a metal-organic reaction with a propyl halide exhibiting an ether function such as, 3-methoxypropyl bromide and is thereafter converted by hydrolysis into the corresponding tertiary carbinol.

It is also possible to react the ketone under the same conditions with a propyne-(1) exhibiting an ether function, such as, 3-methoxy-propyne-(1) and to hydrogenate up to the single bond the triple bond of the 5-hydroxy-5-methoxy-propyne derivative obtained by hydrolysis.

The bromine atom of the 5-hydroxy-5-methoxy-propyl-10-bromo-dibenzo[a,d]cycloheptene obtained can, after dehydration of the carbinol has been effected, be replaced by the alkyl, alkenyl or benzyl residue by reaction with an alkyl, alkenyl or benzyl halide utilizing a metal-organic reaction.

The ether function of the 5-methoxy-propylidene compound thus obtained is replaced by bromine or chlorine by treatment with a hydrohalic acid, such as, an aqueous, concentrated solution of hydrobromic acid or a solution of hydrogen bromide in glacial acetic, or also by treatment with phosphorus oxychloride, or, preferably, by treatment with boron trifluoride in chloroform.

The 5-(halo-propylidene)-10-alkyl, alkenyl or benzyl-dibenzo[a,d]cycloheptene obtained in this manner is a starting compound of the present process corresponding to Formula IV, wherein B is haloethyl.

The same compound is also accessible from the 10-alkyl, alkenyl or benzyl-dibenzo[a,d]cyclohepten-5-one. For example, the ketone is reacted, as previously described, utilizing a metal-organic reaction either with a propyl halide exhibiting an ether function, such as, 3-methoxy-propyl bromide or with a corresponding propyne-(1) derivative, such as, 3-methoxy-propyne-(1). The 5-hydroxy-5-methoxy-propyl-10-alkyl, alkenyl or benzyl-dibenzo[a,d]cycloheptene formed after hydrolysis has taken place can be converted as previously described into the desired 5-halo-propylidene compound of Formula IV.

A further route to the compound of Formula IV, wherein B is haloethyl, likewise begins with the 10-alkyl, alkenyl or benzyl-dibenzo[a,d]cyclohepten-5-one.

The ketone is reacted utilizing metal-organic reaction with a cyclopropyl halide. The 5-hydroxy-5-cyclopropyl derivative obtained by hydrolysis can be converted into the desired 5-bromopropylidene compound of Formula IV by the action of a concentrated hydrohalic acid, such as, hydrobromic acid.

Starting compounds of Formula IV in which B represents the vinyl group can likewise be manufactured from the 10-alkyl, alkenyl or benzyl-dibenzo[a,d]cyclohepten-5-one.

The ketone is reacted, for example, with the help of a metal-organic reaction, with a 1-propenyl halide, such as, 1-propenyl bromide. The 5-hydroxy-5-propen-(1)-yl derivative formed can be converted into the corresponding 5-propenylidene compound of Formula IV by the action of dehydrating agents.

The compounds of Formula IV, wherein B represents the vinyl group can be transformed by addition of hydrogen halide into compounds of Formula III in which B denotes the haloethyl group.

The following examples are presented to further illustrate the invention. All temperatures are in degrees centigrade, unless otherwise mentioned.

Example 1

15.8 g. of 5-(3-chloro-propylidene)-10-allyl-dibenzo-[a,d]cycloheptene, 75 ml. of dry toluene and 50 ml. of dimethylamine are heated at 120° for 20 hours in a pressure vessel. After expelling the excess dimethylamine, the reaction mixture is diluted with ether. The ethereal solution is washed with water and subsequently extracted with dilute hydrochloric acid. The aqueous acidic extract is made alkaline with potassium carbonate. The 5-(3-dimethylamino-propylidene) - 10 - allyl-dibenzo[a,d]cycloheptene which separates as an oil is taken up in ether. After the ether is removed by evaporation, the product is removed by distillation and has a B.P. of 155°/0.01 mm. of mercury.

The 5-(3-chloro - propylidene)-10-allyl-dibenzo[a,d] cycloheptene employed above as starting material can be prepared as follows:

15 g. of magnesium shavings are overlaid with 50 ml. of dry ether and treated with 0.5 ml. of methyl iodide. After the vigorous initial reaction has subsided somewhat, a solution of 54.6 g. of 1-chloro-3-methoxy-propane in 300 ml. of dry ether is added dropwise and the temperature of the reaction mixture is maintained at its boiling. The mixture is subsequently heated at 45° under reflux conditions for a period of 3 hours, cooled with ice-water, treated dropwise over a 1 hour period with a solution of 69.2 g. of 10-bromo-dibenzo[a,d]cyclohepten-5-one in 500 ml. of dry ether and again heated at 45° under reflux conditions for 16 hours. The reaction mixture is again cooled with ice-water and treated with a cold, saturated solution of ammonium chloride. The organic layer is removed and the aqueous phase is shaken out with two 150 ml. portions of ether. The combined ether extracts are dried over sodium sulfate and evaporated. The residual 5-hydroxy-5-(3-methoxy-propyl) - 10 - bromo-dibenzo-[a,d]cycloheptene, after recrystallization from petroleum ether, melts at 82–84°.

50 g. of 5 - hydroxy - 5 - (3 - methoxy - propyl) - 10-bromo-dibenzo[a,d]cycloheptene and 500 ml. of a 3 percent alcoholic hydrochloric acid solution are heated on a steam-bath under reflux conditions for a period of 3 hours. After the alcohol is driven off, the residue is taken up in ether. The ethereal solution is successively washed with water, bicarbonate solution, and water, dried over sodium sulfate and evaporated. The residual 5-(3-methoxy-propylidene)-10-bromo-dibenzo[a,d]cycloheptene, after recrystallization from petroleum ether, boils at 155°/0.05 mm. of mercury and melts at 113–115°.

2 g. of magnesium shavings are treated with a few drops of methyl iodide. As soon as the reaction commences, a solution of 22.7 g. of 5-(3-methoxy-propylidene)-10-bromo-dibenzo[a,d]cycloheptene in 100 ml. of dry, peroxide-free tetrahydrofuran is added dropwise and the internal temperature is maintained at 50 to 55°. The reaction mixture is subsequently boiled under reflux conditions for an additional 3 hours, whereby substantially all of the magnesium is consumed.

The resulting light-brown solution is cooled to 10–15°, treated with a solution of 7.65 g. of allyl bromide in 25 ml. of dry peroxide-free tetrahydrofuran, stirred under reflux conditions for a period of 90 minutes, cooled with ice-water, and treated with a cold saturated aqueous ammonium chloride solution. The tetrahydrofuran is subsequently evaporated under reduced pressure, and the residue is taken up in ether. The ethereal solution is washed with water, dried and evaporated. The residual 5-(3-methoxy - propylidene) - 10 - allyl - dibenzo[a,d]cycloheptene boils at 160°/0.06 mm. of mercury.

16 g. of 5 - (3 - methoxy - propylidene) - 10 - allyl-dibenzo[a,d]cycloheptene are dissolved in 100 ml. of dry chloroform, cooled to −10° and treated dropwise with a solution of 6.5 g. of boron trichloride in 30 ml. of chloroform. After standing at room temperature for a period of 16 hours, the reaction mixture is successively washed with water, a sodium bicarbonate solution and water, dried and evaporated. The residual 5-(3-chloro-propylidene)-10-allyl-dibenzo[a,d]cycloheptene boils at 145–150°/0.01 mm. of mercury.

Example 2

18 g. of 5 - hydroxy - 5 - (3 - dimethylamino-propyl)-10-methyl-dibenzo[a,d]cycloheptene and 180 ml. of 3 percent alcoholic hydrochloric acid are heated on a steam-bath under reflux conditions for a period of 2 hours and subsequently evaporated to dryness. The residual 5-(3-dimethylamino-propylidene)-10-methyl - dibenzo[a,d]cycloheptene boils at 165–170°/0.03 mm. of pressure.

The 5 - hydroxy - 5 - (3 - dimethylamino - propyl)-10-methyl-dibenzo[a,d]cycloheptene employed above as starting material can be prepared as follows:

50 g. of 10 - bromo - dibenzo[a,d]cyclohepten - 5 - one in 150 ml. of ethylene glycol are saturated with hydrochloric acid gas with vigorous stirring. The temperature of the reaction mixture rises to 85°. The temperature of the reaction mixture is subsequently maintained at 100° on a steam-bath for a period of 1 hour, then cooled and poured into excess ice-cold caustic soda. The pricipitated 5,5 - ethylenedioxy - 10 - bromo - dibenzo[a,d]cycloheptene, after recrystallization from petroleum ether, melts at 171–172°.

9 g. of magnesium shavings are treated with a few drops of methyl iodide. As soon as reaction takes place, a solution of 78.6 g. of 5,5-ethylenedioxy-10-bromo-dibenzo[a,d]cycloheptene in 450 ml. of dry, peroxide-free tetrahydrofuran is added dropwise and the internal temperature maintained between 40 and 42°. The reaction mixture is subsequently heated under reflux conditions for an additional 3 hours, whereby substantially all of the magnesium is consumed.

The resulting light-brown solution is cooled with ice-water, treated with a solution of 34 g. of methyl iodide in 50 ml. of dry, peroxide-free tetrahydrofuran, stirred under reflux conditions for a period of 2 hours, again cooled with ice-water and treated with a cold saturated ammonium chloride solution. The tetrahydrofuran is evaporated under reduced pressure and the residue is taken up in chloroform. The chloroform solution is washed with water and evaporated. The residual 5,5-ethylenedioxy-10-methyl-dibenzo[a,d]cycloheptene may be recrystallized from methanol.

25 g. of 5,5 - ethylenedioxy - 10 - methyl - dibenzo[a,d]cycloheptene, 25 ml. of concentrated hydrochloric acid and 250 ml. of acetone are heated under reflux conditions on the steam-bath for a period of 1 hour. The solvent is subsequently removed by evaporation. The residue is taken up in methylene chloride, washed with a sodium bicarbonate solution and water, and evaporated. The residual 10 - methyl - dibenzo[a,d]cyclohepten - 5-one may be recrystallized from methanol.

8 g. of Gilman alloy are overlaid with 20 ml. of dry ether and treated with 0.5 ml. of methyl iodide. After the vigorous initial reaction has subsided, 30 g. of 1-chloro-3-dimethyl-amino-propane in 120 ml. of dry ether are added dropwise and the temperature of the reaction mixture is maintained at its boiling. The mixture is heated at 45° under reflux conditions for an additional period of 4 hours, then cooled with ice-water, and treated dropwise over a period of 1 hour with a solution of 20 g. of 10 - methyl - dibenzo[a,d]cyclohepten - 5 - one in 150 ml. of ether. The reaction mixture is subsequently stirred at 40° under reflux conditions for a period of 6 hours, then cooled with ice-water and treated with a cold, saturated ammonium chloride solution. The organic layer is separated. The aqueous phase is shaken out twice with 100 ml. portions of ether. The ether extracts are combined, dried over sodium sulfate and evaporated. The residual 5 - hydroxy - 5 - (3 - dimethyl - amino - propyl) - 10-methyl-dibenzo[a,d]cycloheptene can be processed as previously set out without further purification.

Example 3

A Grignard compound prepared from 13.2 g. of bromobenzene, 2 g. of magnesium and 50 ml. of absolute ether is treated with 13.9 g. of 5 - propenylidene - 10-methyl-dibenzo[a,d]cycloheptene. The mixture is charged into a moisture-free autoclave. The ether is removed by evaporation with slight heating. The reaction mixture is cooled, charged with 50 ml. of anhydrous methylamine, and heated at 80° for a period of 10 hours. The reaction mixture is thereafter cooled and taken up in ether. The excess methylamine is removed by distillation. The dispersed magnesium hydroxide is precipitated with 25 ml. of water. The supernatant ether solution is removed by decantation and the residue is shaken out twice with ether. In order to remove the last of the remaining methylamine, the combined ether fractions are concentrated under reduced pressure and subsequently dried over sodium sulfate. The difficultly soluble 5 - (3 - methylamino-propylidene) - 10 - methyl - dibenzo[a,d]cycloheptene acetate which is precipitated from an ethereal solution by addition of 3 g. of glacial acetic is treated with dilute ammonia. The free base which separates is extracted with ether. The resulting ethereal solution is dried and treated with ethanolic hydrochloric acid. The 5-(3-methylamino-propylidene) - 10 - methyl - dibenzo[a,d]cycloheptene hydrochloride which is formed after recrystallization from ethanol/ethyl ether melts at 200–202°.

The 5 - propenylidene - 10 - methyl-dizenzo[a,d]cycloheptene employed as the starting material can be prepared as follows:

6.45 g. of magnesium shavings are treated with 21.6 g. of allyl bromide in 180 ml. of absolute ether to form an allyl magnesium bromide solution. To this are added dropwise 16.7 g. of 10 - methyl - dibenzo[a,d]cyclohepten-5-one in 100 ml. of absolute ether and 50 ml. of absolute benzene over a period of 1 hour. The reaction mixture is subsequently heated under reflux conditions for a period of 1 hour and thereafter treated with a saturated ammonium chloride solution. The organic layer is separated. The aqueous phase is extracted with ether. The combined ether extracts are evaporated. The 5 - hydroxy-5 - allyl - 10 - methyl-dibenzo[a,d]cycloheptene (20 g.) which separates as a yellow oil is stirred and heated at 90° with 10 g. of acetic acid anhydride and 10 ml. of absolute toluene. 0.5 ml. of acetyl chloride are introduced when the internal temperature reaches 85°. The internal temperature thereupon rises to 100° Thereafter, the reaction mixture is cooled, diluted with ether, washed with aqueous ammonia and dried. The residual 5 - propenylidene -10 - methyl-dibenzo[a,d]cycloheptene, after evaporation of the ether, is a yellow-brown oil.

Example 4

11.8 g. of 5 - (3 - chloropropylidene) - 10-methyl-dibenzo[a,d]cycloheptene, 50 ml. of toluene and 50 ml. of methylamine are heated at 120° for 20 hours in a pressure vessel. The excess methylamine is subsequently driven off under reduced pressure. Thereafter, the reaction mixture is diluted with ether, washed with water and extracted with dilute hydrochloric acid. This aqueous acidic solution is made alkaline with potassium carbonate. The oil which separates is shaken out with ether. The residual, oily 5 - (3 - methylamino - propylidene)-10-methyl - dibenzo[a,d]cycloheptene, after evaporation of the solvent, boils at 160/0.01 mm. of mercury. The hydrochloride addition salt thereof melts at 201–203° after recrystallization from ethanol/ether.

The 5 - (3 - chloro - propylidene)-10-methyl-dibenzo[a,d]cycloheptene employed as the starting material can be prepared as follows:

4 g. of magnesium shavings are treated with a few drops of methyl iodide. As soon as reaction commences, 45.5 g. of 5 - (3 - methoxy-propylidene) - 10-bromo-dibenzo[a,d]cycloheptene in 200 ml. of dry, peroxide-free tetrahydrofuran are added dropwise and the internal temperature of the reaction mixture is maintained between 50 and 55°. The reaction mixture is subsequently heated under reflux conditions for an additional 3 hours, whereby substantially all of the magnesium is consumed.

The resulting brown solution is cooled to 10–15°, treated with a solution of 17.95 g. of methyl iodide in 50 ml. of dry, peroxide-free tetrahydrofuran, stirred under reflux conditions for 90 minutes, cooled with ice-water and treated with a cold saturated aqueous ammonium chloride solution. The tetrahydrofuran is removed by evaporation under reduced pressure and the residue is taken up in ether. The ethereal solution is washed with water, dried over sodium sulfate and evaporated. After recrystallization from alcohol, the residual 5 - (3-methoxy-propylidene) - 10 - methyl - dibenzo[a,d]cycloheptene melts at 125–128°.

11 g. of 5 - (3 - methoxy - propylidene)-10-methyl dibenzo[a,d]cycloheptene are dissolved in 100 ml. of methylene chloride, cooled to —10° C., and treated dropwise with a solution of 6 g. of boron trichloride in 30 ml. of methylene chloride. After standing at room temperature for 15 hours, the reaction mixture is washed with water, with a sodium bicarbonate solution and again with water, dried and evaporated. The residual 5 - (3-chloropropylidene) - 10 - methyl - dibenzo[a,d]cycloheptene boils at 155–158° and 0.03 mm. of mercury.

Example 5

13.2 g. of crude N-benzylidene-N-[3-(5-hydroxy-10-methyl-dibenzo[a,d]cycloheptene - 5 - yl) - propyl]-N-methyl-ammonium-p-toluenesulfonate are dissolved in 100 ml. 1/N hydrochloric acid are warmed for 15 minutes on a water bath, cooled and alkalized by the addition of potassium carbonate. The precipitated oil is extracted with either. The extract is dried and treated with ethanolic hydrochloric acid. After recrystallization from ethanol-ether, the precipitated 5-(3-methylamino-propylidene)-10-methyl-dibenzo[a,d]cycloheptene hydrochloride melts at 200–202°.

The N-benzylidene-N-[3-(5-hydroxy - 10 - methyl-dibenzo[a,d]cycloheptene-5 - yl)-propyl]-N-methyl-ammonium-p-toluenesulfonate utilized as the starting material can be prepared according to the following:

6.7 g. of 10-methyl-dibenzo[a,d]cyclohepten - 5 - one, prepared according to the procedure of Example 2, are dissolved in 20 ml. of toluene and added dropwise with agitation to 30 ml. of liquid ammonia previously dried over sodium chips. 1.4 g. of sodium are added to the reaction mixture piece by piece over a period of 30 minutes. The mixture is agitated for an additional hour and then reacted with 3.5 g. of freshly distilled 1-chloro-3-aminopropane (free base) in 20 ml. of toluene. The reaction mixture is carefully treated with water after 12 hours of agitation. The organic phase is separated and treated with 4 g. of benzaldehyde. The toluene and the liberated water are removed by distillation under reduced pressure. The residual benzylidene compound is mixed with 5.0 g. of the methyl-p-toluenesulfonate, slowly heated to and maintained at 120° for 30 minutes, whereby the desired N-benzylidene-N-[3-(5-hydroxy - 10 - methyl-dibenzo[a,d]cycloheptene - 5 - yl)-propyl]-N-methyl-ammonium-p-toluenesulfonate is formed.

Example 6

25 g. of ethyl chloroformate in 80 ml. of dry benzene are slowly dropped into a solution of 20 g. of 5-(3-dimethylaminopropylidene) - 10 - methyl-dibenzo[a,d]cycloheptene in 80 ml. of dry benzene. The reaction mixture is heated under reflux conditions over a period of 20 hours, then cooled, washed with three 200 ml. portions of 3-N hydrochloric acid and with water, dried and subsequently evaporated. The residual oily 5-(3-methyl-carbethoxyamino-propylidene) - 10 - methyl-dibenzo[a,d]cycloheptene boils at 175°/0.01 mm. of mercury.

17.8 g. of 5-(3-methyl-carbethoxyamino-propylidene)-10-methyl-dibenzo[a,d]cycloheptene, 20 g. of potassium hydroxide and 200 ml. of n-butanol are heated under reflux conditions in a nitrogen atmosphere with stirring for a period of 17 hours. The butanol is subsequently removed by distillation under reduced pressure. The residue is taken up in 170 ml. of sulfuric acid, heated at 70° for a brief time, then washed with two 200 ml. portions of hexane and made alkaline with caustic soda. The oil which separates is extracted with ether. The ethereal solution is washed with water, dried and evaporated. The residual oily 5 - (3-methyl-propylidene)-10-methyl-dibenzo[a,d] cycloheptene boils at 160°/0.01 mm. of pressure. After recrystallization from ethanol/petroleum ether, the compound melts at 201–203°.

Example 7

Capsules are formulated as follows:

|  | Mg. |
|---|---|
| 5 - (dimethylamino - propylidene) - 10 - allyldibenzo [a,d]cycloheptene | 10 |
| Mannitol | 110 |
| Talcum | 5 |
|  | 125 |

The active substance is homogeneously mixed with the talcum and mannitol, sieved, again thoroughly mixed and filled into No. 4 gelatin capsules.

Example 8

Dragees are formulated as follows:

|  | Mg. |
|---|---|
| 5 - (methylamino - propylidene) - 10 - methyldibenzo [a,d]cycloheptene | 25 |
| Mannitol | 100 |
| Maize starch | 20 |
| Talcum | 5 |
|  | 150 |

A 10 percent aqueous paste prepared from the maize starch is homogeneously mixed with the mannitol, the talcum and the active substance, granulated and pressed to kernels which can be coated with a sugar layer in the usual manner.

From the foregoing description and examples, it will be apparent to those skilled in the art that various modifications are possible without departing from the scope of the invention and, therefore, said description and examples are not to be construed as limiting the invention except as defined by the appended claims.

What is claimed is:

1. A compound selected from the group consisting of compounds of the formula:

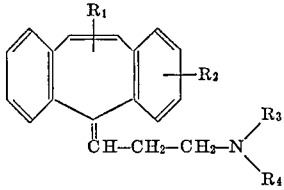

wherein $R_1$ is selected from the group consisting of alkyl of 1–4 carbon atoms, alkenyl of 2–4 carbon atoms and benzyl; $R_2$ is selected from the group consisting of hydrogen and halogen; $R_3$ is alkyl of 1–4 carbon atoms; and $R_4$ is selected from the group consisting of hydrogen and alkyl of 1–4 carbon atoms; and pharmaceutically acceptable acid addition salts thereof.

2. A compound in accordance with claim 1 wherein $R_2$ is hydrogen.

3. A compound in accordance with claim 2 wherein $R_1$ is alkyl of 1–4 carbon atoms.

4. A compound in accordance with claim 2 wherein $R_1$ is alkenyl of 2–4 carbon atoms.

5. A compound of the formula:

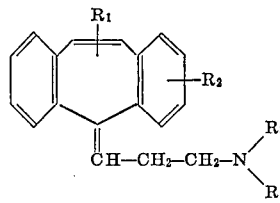

wherein $R_1$ is benzyl; $R_2$ is hydrogen; $R_3$ is alkyl of 1–4 carbon atoms; and $R_4$ is selected from the group consisting of hydrogen ad alkyl of 1–4 carbon atoms, and pharmaceutically acceptable acid addition salts thereof.

6. 5-(3-dimethylamino-propylidene) - 10 - methyl-dibenzo[a,d]cycloheptene.

7. 5 - (3 - methylamino-propylidene)-10-methyl-dibenzo[a,d]cycloheptene.

8. 5-(3-dimethylamino-propylidene) - 10 - allyl-dibenzo[a,d]cycloheptene.

References Cited

UNITED STATES PATENTS

| | | | |
|---|---|---|---|
| 3,332,977 | 7/1967 | Wendler | 260—570.8 X |
| 3,372,196 | 3/1968 | Engelhardt | 260—570.8 |
| 3,409,640 | 11/1968 | Villani | 260—570.8 |

ROBERT V. HINES, Primary Examiner

U.S. Cl. X.R.

260—240, 247.7, 268, 294.7, 326.5, 340.5, 471, 501.1, 501.18, 501.2, 551, 566, 567.6, 570.5, 590, 592, 611, 618, 649, 669; 424—248, 250, 267, 274, 330